UNITED STATES PATENT OFFICE 2,636,871

METHOD OF PREPARING VINYL CHLORIDE RESIN DISPERSIONS AND RESULTING PRODUCTS

Raymond W. James, Lexington, and David W. Lovering, Needham, Mass., assignors to Arthur D. Little, Inc., Cambridge, Mass., a corporation of Massachusetts No Drawing. Application August 12, 1950,
Serial No. 179,096

13 Claims. (Cl. 260—33.6)

This invention relates to the preparation of a coating composition and to the coating of webs with a vinyl chloride polymer or co-polymer and is a continuation-in-part of our U. S. application Ser. No. 617,442 filed September 19, 1945.

Two processes in wide use for applying coatings may be termed the "solution" method and the "solid" method. Each may have its peculiar advantages and disadvantages for a given coating composition and end product. In general the solvent method consists in dissolving or dispersing the resin in a volatile medium and applying the resulting product to a web, while the solid method consists of producing proper coating characteristics by heating or mechanically working the material.

Though one or the other of these methods may be quite satisfactory for some materials, they are not particularly satisfactory for the polymers of this invention. The solid coating process is usually carried out by working the polymer on a rubber mill or a Banbury mixer at high temperatures to get a mass of proper plasticity for coating purposes. During coating the mixture may be held at temperatures in the order of from 302 to 356° F. for considerable periods of time. Such temperatures may not easily be attainable by usual equipment so that special heating equipment may be necessary. Aside from the undesirable and not inconsiderable cost factor incident to the use of such temperatures, the principal difficulty resides in the alteration in the polymer itself. Hydrochloric acid may split out, and discoloration and embrittlement, or excessive softening follow even though precaution is taken to use a heat stabilizer.

But solution coating is also not satisfactory when applied to vinyl chloride polymers including polyvinyl chloride and polyvinyl chloride co-polymers containing more than 92% polyvinyl chloride. Such polymers, however, when applied provide coatings of a superior character. Useful volatile solvents available (principally high boiling ketones) do not make good solutions of these polyvinyl chloride polymers at room temperature or slightly elevated temperatures, but produce a gel-like product which does not lend itself to ordinary coating techniques.

Coating has also been attempted at elevated temperatures of at least 158° F. While this procedure makes coating possible, there is an excessive use of solvents. For instance, for polyvinyl chloride the maximum advisable resin content is 12% in methyl ethyl ketone at 158° F. Thus a considerable amount of solvent must be evaporated during the drying process. Because they are all high cost and the majority of the useful solvents may not be successfully recovered, the process is prohibitively expensive. Furthermore the solvents are all difficult to remove completely and they may accelerate decomposition of the coating on standing even when present in minute amounts.

Dispersion techniques have been proposed which depend upon the use of delicately balanced ratios of organic non-solvents and swelling agents. Such processes require long periods of ball milling and result in a product with little internal cohesion i. e., ready ability to spread into a continuous sheet.

It is an object of this invention to prepare a suitable coating composition of a vinyl chloride polymer which may be readily applied and which is economical to prepare.

It is a further object to produce coated products with a vinyl chloride polymer which are superior to those obtained by conventional methods.

Other objects will appear from the following disclosure.

Briefly these objects may be accomplished by milling 100 parts by weight of the polymer, together with whatever amount of pigment is desired, with from 50 to 80 parts of a plasticizer mixture containing from 0.5 to 80 parts of a plasticizer which is a solvent for the resin, until the proper coating consistency is obtained. Completion of the milling step is determinable when partial solvation is attained. The viscosity of the mixture may be subsequently regulated with an organic non-solvent such as a hydrocarbon. The product is applied to a web in any suitable manner, as with a coating knife, and fluxed to produce complete solvation and a durable and attractive product.

In order to more clearly define what is meant by partial solvation, the following discussion is given. A resin, for example a vinyl chloride-vinyl acetate copolymer, in the solid, finely powdered condition may be dispersed in a non-solvent to give a suspension. The resin particles settle rapidly, the suspension has a low viscosity and no tendency to sheet as the particles would separate when the liquid is removed. If a poor solvent is used as a dispersing agent, the particles of resin will, if the particle size is sufficiently fine and thorough mixing is attained, be partially swelled or solvated but will remain as discrete particles. These particles will be dispersed in the liquid resulting in a suspensoid type colloidal solution. However, they will have the property of length and be satisfactory for knife coating. If a reasonable amount of an active solvent is used to treat the resin, or a large amount of a poor solvent thoroughly worked with the resin, the resin becomes completely solvated. In this state the solution becomes an emulsoid solution. Such emulsoids are always much more viscous than suspensoids. If an excess of a very powerful solvent is employed, a true solution may be obtained which is less viscous than the emulsoid type solution.

A standard for determining whether or not a material is a plasticizer and if a plasticizer whether it is a solvent plasticizer, or a non-solvent plasticizer has been established for use in the specification and in the appended claims. By that standard if nine parts by weight of a plasticizer are mixed with one part by weight of finely divided resin, the mixture stirred and heated to 302° F. and allowed to cool to room temperature and the mixture is a sol, it is a solvent plasticizer. If the resulting mixture is a gel, the plasticizer is a non-solvent plasticizer. If the resin does not go into solution to any substantial degree, the material is not a plasticizer. For the purpose of this invention a solvent plasticizer is an organic liquid, having an evaporation rate of less than that of dimethyl phthalate, and when mixed with finely divided resin in the ratio of nine parts of plasticizer to one part of resin by weight, stirred and heated to 302° F. and cooled to room temperature, the resulting mixture is a sol. A sol is a colloidal organic solution having a zero yield point. A non-solvent plasticizer is an organic liquid having an evaporation rate of less than that of dimethyl phthalate, and when mixed with finely divided resin in the ratio of nine parts of plasticizer to one part of resin by weight, stirred and heated to 302° F., and cooled to room temperature, the resulting mixture is a gel. A gel is a colloidal organic solution having a measurable yield point.

The partial solvation of the resin which is an essential feature of the above described process may therefore be defined as a condition in which particles of resin have been swollen by the action of solvent but have not been swollen to the extent that the resin particles have lost their identity. But for the process to operate, the particle size of the partially solvated particles must be small, i. e. in the order of the resin described in the examples.

Examples of solvent plasticizers suitable for the process just described include dioctylphthalate, tricresyl phosphate, butoxy glycol phthalate, and dibutyl sebacate. The solvent plasticizer must be present in the plasticizer mixture to the extent of at least about .5 part by weight of the total plasticizer mixture, said mixture amounting to not more than 80 parts by weight per 100 parts of the resin. The plasticizer mixture may however be composed entirely of solvent plasticizer. Though the range of plasticizer mixture to be incorporated is in the order of 50 to 80 parts by weight on 100 parts of the resin, and will give reasonably satisfactory products, the optimum amount to yield a desired result with any given polymer and plasticizer must be determined experimentally. Such factors as the amount and kind of pigment employed, the temperature at which the milling operation is carried out, the particular plasticizer mixture employed and the end product desired all affect the quantity to be used.

The milling may be advantageously accomplished on any standard three roll mill, although a mill containing more than three rolls is also satisfactory; it may also be accomplished in a ball mill or a Banbury mixer.

The time necessary to obtain the proper consistency using only a three roll mill varies with the amount of material, the setting of the rolls, the temperature of operation, the speed of operation, the kind and amount of plasticizer and the size of the apparatus. Partial solvation may usually be obtained with from 3 to 5 passes, though with less effective plasticizers the grinding should be continued further. Using a ball mill alone the process requires about twenty-four hours. A desirable method of operation consists of milling and plasticizer, pigment and resin in a ball mill from 2 to 8 hours and then putting the mixture through a three roll mill one or two times.

When the milling is completed, the plasticized polymer is applied directly to a web, as by a doctor knife. If the coating requires thinning, the composition may be thinned with a volatile non-solvent for the resin such as a petroleum hydrocarbon fraction, for example, gasoline. The amount of petroleum thinner may vary from 0 to about 25% on the weight of resin.

After the material has been applied it is "fluxed." This process, which is well known in the art, consists of heating the material for a short time until it has become homogeneous. Such temperatures of heating may be from 250–400° F. It is neither necessary nor particularly desirable to remove the volatile non-solvent prior to fluxing. The fluxing step completely solvates the resin thus giving a homogeneous and tough product.

In order to understand the process of this invention more clearly the following general method of treating the resin and coating is given.

To 100 parts of the resin is added from 0 to 100 parts of pigment and/or filler and from 50 to 80 parts of plasticizer mixture containing at least .5 part by weight of solvent plasticizer. The mixture is passed and repassed through a three roll mill until the mass assumes a uniform and sufficiently fluid character. The non-solvent volatile fluid is added slowly up to 25 parts by weight on the resin with rapid agitation until the proper viscosity is secured. (If desired part or all the pigment may also be incorporated at this point, but such a procedure is not preferred.) The resulting material is then applied to the web and "fluxed."

The following examples of formulations and procedures which are particularly desirable are illustrative. Parts are by weight.

I

| Materials: | Function |
|---|---|
| 100 parts VYNU [1] | resin |
| 75.2 parts Flexol 4GO (tetraethylene glycol di-2-ethyl hexoate) | non-solvent plasticizer |
| 4.8 parts dioctyl phthalate | solvent plasticizer |
| 12.0 parts basic lead carbonate | pigment |
| 18.0 parts chrome green | pigment |
| 30.0 parts Asbestine (commercial magnesium silicate) | filler |

[1] VYNU—a vinyl chloride copolymer containing 95% vinyl chloride, the particles of which are substantially all less than 10 microns in diameter.

The above materials are mixed and passed through a three roll mill three times. Twenty parts of gasoline are mixed by agitation until the mixture is of uniform consistency. It is then applied to cloth by knife coating to the extent of about two pounds per square yard. The coated cloth is placed between platens which are heated to 350° F. and pressed at 100 pounds per square inch pressure for 10 seconds. The finished product is a flexible, glossy, tough, and tightly adhering coating.

II

Materials:                                      Function
    100 parts VYNU_____   resin
    40 parts hydrogenated methyl
        abietate_____   non-solvent
                                                        plasticizer
    40 parts tricresyl phosphate___   solvent
                                                        plasticizer
    12 parts basic lead carbonate___   pigment
    18 parts chrome green_____   Do.
    30 parts Asbestine_____   filler The materials are mixed on a three roll mill with five passes. It is then applied from a three roll friction calendar on paper to the extent of about 6 ounces per square yard. It is fluxed by polished calendar rolls heated to 350° F. The product is a glossy, tough, paper product.

III

Materials:                                      Function
    100 parts VYNU_____   resin
    60 parts dibutyl sebacate_____   solvent
                                                        plasticizer
    20 parts KP 120 (methoxygly-
        col acetyl ricinolate)_____   non-solvent
                                                        plasticizer
    12 parts basic lead carbonate___   pigment
    18 parts chrome green_____   Do.
    30 parts Asbestine_____   filler The above materials are ground together in a ball mill for 4 hours and then passed once through a three roll mill. The composition is diluted with 25 parts of mineral spirits. Applied to a cotton fabric as in Example I, a similar product is obtained.

IV

Materials:                                      Function
    100 parts VYNU _____   resin
    60 parts dicapryl phthalate _   solvent plasticizer The above materials are ground in a ball mill for 24 hours, diluted with 10 parts of water and coated as in Example I. A water white tough product results.

V

Materials:                                      Function
    100 parts VYNU _____   resin
    .5 part diamyl phthalate _____   solvent plasticizer
    79.5 parts Flexol 4GO _____   non-solvent plasticizer

VI

Materials:                                      Function
    100[1] parts vinyl chloride-di-
        ethyl maleate copolymer ___   resin
    15 parts dioctyl phthalate _____   solvent plasticizer
    65 parts butyl acetyl ricinolate_  non-solvent plasticizer

[1] 95% vinyl chloride.

The plasticizers were mixed and passed several times through a three roll mill with the resin. The composition was knife-coated on a smooth glass surface, placed in an oven and heated to 350° F. for 5 minutes. The resulting tough, clear, flexible film was removed from the glass.

VII

Materials:                                      Function
    100 parts of polyvinyl chloride _  resin
    2.5 parts of dioctyl phthalate __  solvent plasticizer
    77.5 parts of tetraethylene
        glycol di-2-ethyl hexoate ___  non-solvent plasticizer The plasticizers were mixed and milled on a three roll mill. The resulting compound had good length and was knife-coated on a smooth glass surface, and fused in an oven at 300° F. for 5 minutes. When removed from the glass the fused sheet was clear and tough.

The above materials are ground together on a three roll mill by 4 passes. The coating composition was similar in characteristics to that of Example IV when similarly diluted.

It may be seen that by the process of this invention the disadvantages incident to the use of high heat and large quantities of solvents which must be removed are obviated. The mixture coats easily and has sufficient "length." By length is meant that characteristic of a coating composition which permits spreading to form a continuous film. An example of a "short" material is the familiar gelatin dessert which, if coating were attempted, would break and fail to spread.

The examples given above illustrate several of the phases of the present invention. The use of the non-solvent plasticizer is advantageous where the solvent plasticizer chosen is expensive. Since large amounts of solvent plasticizers may cause the final product to be undesirably tacky for some purposes, non-solvent plasticizers are conveniently included to reduce or eliminate such tackiness.

The use of the solvent plasticizer is essential to this invention, but is to be clearly distinguished from the use of a solvent. The presence of a solvent in the resin composition presents problems incident to maintaining a stable product, and removal of the solvent involves considerable difficulty. The solvent plasticizer employed by the method of this invention is an integral component of the composition and its presence is necessary to obtain the desired characteristics of the finshed product.

It is believed to be a feature of this invention that incomplete solvation is achieved in the mixing. Complete solvation is reached during the fluxing step. The process of this invention for producing a coating composition differs from the known use of solvents and/or solvent plasticizers in that by calendering and solvent application processes substantially complete solvation is obtained prior to coating and to reduce the viscosity considerable solvent and/or heat is necessary.

To attain the effect of partial solvation, as stated above, some solvent plasticizer is required. But as shown by Example V only about .5 part by weight on 100 parts of the resin may be used. By employing such a small percentage of solvent plasticizer and by avoiding the use of volatile solvents, a finished product entirely free of any tackiness may be obtained. Such a property is highly desirable for many purposes.

Operating the process above described with a plasticizer mixture containing more than 50% of solvent plasticizer is not preferred because complete solvation is too easily secured. That is, using plasticizer compositions containing high amounts of solvent plastcizer requires that great care be taken since the somewhat elevated temperature often encountered in the milling operation may cause complete solvation with consequent difficulty in coating the composition.

Products containing from 1 to 15% by weight of solvent plasticizer of the total plasticizer mixture are preferred. That is, from 0.5 to 10 parts by weight of solvent plasticizer to 100 parts by weight of resin is a particularly useful range.

The process of this invention may be applied to vinyl chloride resins including polyvinyl chloride, and copolymers of vinyl chloride with such materials as vinyl acetate, vnylidene chloride, and maleic acid esters such as diethyl maleate and dibutyl maleate. The copolymers must, however, contain not more than 15% of the copolymerizable material. Polymers containing more than the percentages stated above, while they may be treated by our process, produce products which are inferior in many respects to those produced from polymers containing more than 85% vinyl chloride. Polyvinyl chloride acetate copolymers containing at least 92% polyvinyl chloride are to be preferred for most uses. It is also essential that the polymer used be very finely divided i. e., in the order of 10 microns or less. In order that the process operates successfully the particles, as stated above, must be partially solvated.

A further observation which has been made is the apparent change in character in the mixture when various quantities of volatile hydrocarbon diluent are added. For example, when up to 25 parts of diluent to 100 parts of resin by weight are added, a mixture having considerable flow and length results with decreasing viscosity with increasing quantity of hydrocarbon diluent. When somewhat more diluent is added, for example 35 parts to 100 parts of resin, the mixture becomes "short" and "buttery" and has the characteristics of a gel. A petroleum hydrocarbon is the preferred diluent. Any person skilled in the art will easilyl recognize the change in character of the composition and will dilute the partially solvated resin to the proper point. The degree of solvation, the resin used and other factors affect the amount of non-solvent which may be added, but amounts up to 25% by weight of non-solvent on the resin may safely be added.

An advantage of the process for producing the compositions described herein is that these compositions can be prepared in which there are no undue viscosity changes upon standing. Over long periods of time there may be some increase in viscosity, but this increase is at a minimum.

The coated fabric may be embossed by stamping or pressing to produce a satisfactory artificial leather. The product may be varied in flexibility from one which is pliable to one of considerable stiffness depending upon the material coated and the particular coating composition employed. Thus, because of the toughness and range of flexibility of the finished product it is useful for coverings of automobile seats, outdoor furniture, etc. Because it is waterproof, light, and relatively economical, it is an ideal material for many uses to which rubber is put such as raincoats, and other weather protecting coverings.

We claim:

1. The process of preparing a resin coating composition which comprises milling together 50 to 80 parts by weight of plasticizer mixture of solvent and non-solvent plasticizers and 100 parts of a finely divided vinyl chloride resin consisting of at least 85% by weight of vinyl chloride having an average particle size not more than 10 microns in diameter until partial solvation is secured and until the composition has substantial length and adding as the only volatile material a volatile aliphatic petroleum hydrocarbon in an amount not exceeding 25 parts by weight of the resin, said solvent plasticizer being present in quantity of between 1.0 and 50 percent by weight of the plasticizer mixture, said solvent plasticizer being the only solvating agent for the resin employed in the process, said solvent plasticizer being an organic liquid having an evaporation rate less than that of dimethyl phthalate, and when mixed with said resin in the ratio of nine parts of plasticizer to one part of resin by weight, stirred and heated to 302° F., and cooled to room temperature, the resulting mixture is a sol, said non-solvent plasticizer being an organic liquid having an evaporation rate less than that of dimethyl phthalate, and when mixed with said resin in the ratio of nine parts of plasticizer to one part of resin by weight, stirred and heated to 302° F., and cooled to room temperature, the resulting mixture is a gel.

2. The process of preparing a resin coating composition which comprises milling together 50 to 80 parts by weight of plasticizer mixture of solvent and non-solvent plasticizers and 100 parts of finely divided resin of the group consisting of polyvinyl chloride, vinyl chloride-vinyl acetate copolymer, vinyl chloride-vinylidene chloride copolymer, and vinyl chloride-maleic acid ester wherein said copolymers consist of at least 85% by weight of vinyl chloride, said resin having an average particle size not more than 10 microns in diameter, until partial solvation is secured and until the composition is suitable for knife coating, and adding as the only volatile material a volatile aliphatic petroleum hydrocarbon in an amount not exceeding 25 parts by weight of the resin, said solvent plasticizer being present in quantity of between 1.0 and 50 percent by weight of the plasticizer mixture, said solvent plasticizer being the only solvating agent for the resin employed in the process, said solvent plasticizer being an organic liquid having an evaporation rate less than that of dimethyl phthalate, and when mixed with said resin in the ratio of nine parts of plasticizer to one part of resin by weight, stirred and heated to 302° F., and cooled to room temperature, the resulting mixture is a sol, said non-solvent plasticizer being an organic liquid having an evaporation rate less than that of dimethyl phthalate, and when mixed with said resin in the ratio of nine parts of plasticizer to one part of resin by weight, stirred and heated to 302° F., and cooled to room temperature, the resulting mixture is a gel.

3. The process according to claim 2 wherein the polymer is polyvinyl chloride.

4. The process according to claim 2 wherein the polymer is vinyl chloride-vinyl acetate copolymer.

5. The process according to claim 2 wherein the polymer is vinyl chloride-vinylidene chloride copolymer.

6. The process according to claim 2 wherein the polymer is vinyl chloride-maleic acid ester copolymer.

7. A coated product consisting of a web and a coating thereon, said coating comprising a vinyl chloride resin, and a plasticizer mixture of solvent and non-solvent plasticizers, said resin consisting of at least 85% vinyl chloride by weight, said coating being characterized by containing as the only solvent for the resin a solvent plasticizer, by the plasticizer mixture being present in an amount between 50 and 80 parts by weight on 100 parts of resin, said solvent plasticizer being present in an amount between 1 and 15% by weight of the total plasticizer, and by being tough and resistant to wear, said solvent plasticizer being an organic liquid having an evaporation rate less than that of dimethyl phthalate, and when mixed with said resin in the ratio of nine parts of plasticizer to one part of resin by weight, stirred and heated to 302° F., and cooled to room temperature, the resulting mixture is a sol, said non-solvent plasticizer being an organic liquid having an evaporation rate less than that of dimethyl phthalate, and when mixed with said resin is the ratio of nine parts of plasticizer to one part of resin by weight, stirred and heated to 302° F., and cooled to room temperature, the resulting mixture is a gel.

8. A composition comprising a resin and a plasticizer mixture of solvent and non-solvent plasticizers, said resin being a vinyl chloride polymer consisting of at least 85% by weight of vinyl chloride and having a particle size of not more than 10 microns in diameter, said composition being characterized by containing as the only solvating agent for the resin a solvent plasticizer, by containing as the only volatile material up to 25 parts of aliphatic petroleum hydrocarbon by weight on 100 parts of the resin, and by the resin being partially solvated, said plasticizer mixture being present in an amount of 50 to 80 parts by weight on 100 parts of resin, said solvent plasticizer being present in an amount between 1 and 15% by weight of the plasticizer mixtures, and by haviing the coating characteristic of substantial length, said solvent plasticizer being an organic liquid having an evaporation rate less than that of dimethyl phthalate, and when mixed with said resin in the ratio of nine parts of plasticizer to one part of resin by weight, stirred and heated to 302° F., and cooled to room temperature, the resulting mixture is a sol, said non-solvent plasticizer being an organic liquid having an evaporation rate less than that of dimethyl phthalate, and when mixed with said resin in the ratio of nine parts of plasticizer to one part of resin by weight, stirred and heated to 302° F., and cooled to room temperature, the resulting mixture is a gel.

9. The composition in accordance with claim 8 wherein the resin is a member of the group consisting of polyvinyl chloride, vinyl chloride-vinyl acetate copolymer, vinyl chloride-vinylidene chloride copolymer, and vinyl chloride-maleic acid ester copolymer.

10. The composition in accordance with claim 8 wherein the polymer is polyvinyl chloride.

11. The composition in accordance with claim 8 wherein the polymer is a copolymer of vinyl chloride and vinyl acetate.

12. The composition in accordance with claim 8 wherein the polymer is a copolymer of vinyl chloride and maleic acid ester.

13. The composition in accordance with claim 11 wherein the vinyl chloride content of the polymer is at least 92%.

RAYMOND W. JAMES.
DAVID W. LOVERING.

References Cited in the file of this patent

UNITED STATES PATENTS

| Number | Name | Date |
| --- | --- | --- |
| 2,431,078 | Powell | Nov. 18, 1947 |
| 2,507,688 | Armstrong | May 16, 1950 |

OTHER REFERENCES

Plasticizers, publication by Carbide and Carbon Chemicals Corp., pub. 1944 (pages 12 and 13).

Synthetic Organic Chemicals, publication by Carbide and Carbon Chemicals Corp., pub. July 1, 1946 (pages 50 and 52).